US009563576B1

(12) United States Patent
Horon (10) Patent No.: US 9,563,576 B1
(45) Date of Patent: Feb. 7, 2017

(54) AREA-LIMITED SOFTWARE UTILITY

(76) Inventor: Daniel J. Horon, Minneapolis, MN (US)

( * ) Notice: Subject to any disclaimer, the term of this patent is extended or adjusted under 35 U.S.C. 154(b) by 1532 days.

(21) Appl. No.: 11/848,833

(22) Filed: Aug. 31, 2007

Related U.S. Application Data (60) Provisional application No. 60/841,470, filed on Aug. 31, 2006.

(51) Int. Cl.
  *G06F 12/04* (2006.01)
  *G06F 12/14* (2006.01)
  *G06F 13/00* (2006.01)

(52) U.S. Cl.
  CPC .............. *G06F 12/14* (2013.01); *G06F 13/00* (2013.01)

(58) Field of Classification Search
  CPC .................... H04M 1/72597; H04M 2250/12; H04M 1/72572; H04M 1/72563; H04M 1/72569; H04W 48/04; H04W 48/02; H04W 4/02; H04W 4/04; H04W 4/021; H04W 4/026; H04W 4/027; H04W 4/043; H04W 12/06; H04W 12/08; H04W 64/00; H04W 64/006; H04K 3/415; H04N 21/4122; H04N 21/4335; H04N 21/4394; H04N 21/4722; H04N 21/632; H04N 21/8358; H04N 5/765; G06F 19/00; H04L 63/107; H04L 67/18
  USPC .......... 726/17; 701/207, 213, 214, 215, 216; 342/357, 450, 89, 91; 455/456.6; 340/5.28, 5.32, 825.49, 573.1; 365/152; 713/200
  See application file for complete search history.

(56) References Cited

U.S. PATENT DOCUMENTS

| | | | |
|---|---|---|---|
| 5,737,415 A | 4/1998 | Akiyama et al. | |
| 5,761,651 A | 6/1998 | Hasebe et al. | |
| 6,044,469 A | 3/2000 | Horstmann | |
| 6,369,695 B1 | 4/2002 | Horon | |
| 6,457,129 B2 * | 9/2002 | O'Mahony | 726/4 |
| 6,460,023 B1 | 10/2002 | Bean et al. | |
| 7,032,048 B2 | 4/2006 | Appleby et al. | |
| 7,035,626 B1 | 4/2006 | Luciano, Jr. | |
| 2002/0017977 A1* | 2/2002 | Wall | 340/5.28 |
| 2002/0063597 A1* | 5/2002 | Segallis et al. | 330/129 |
| 2003/0051169 A1* | 3/2003 | Sprigg et al. | 713/201 |
| 2004/0252547 A1* | 12/2004 | Wang | 365/154 |

(Continued)

OTHER PUBLICATIONS

Ardagna (Mar. 2006). Supporting location-based conditions in access control policies: location-based access control policies. ASIACCS'06 Taipei, Taiwan.*

(Continued)

*Primary Examiner* — Brian Shaw
(74) *Attorney, Agent, or Firm* — Todd R. Fronek; Larkin Hoffman Daly & Lindgren, Ltd.

(57) ABSTRACT

Computers and networks are configured to operate according to alternative protocols for using software applications, depending on geographic location. In one approach each computer incorporates a GPS receiver using GPS satellite signals to generate the computer's current location. The location is compared with permitted use region information stored in the computer or network, e.g. based on a boundary defining a permitted use region. In another approach, E-911 compliant transceivers use signals from E-911 towers in the same manner. In a further approach, each computer incorporates a WiFi adaptor, RFID reader or RFID tag, and the territory is defined by the distance from a center point. In all cases, the computer either operates under a relatively open protocol relative to using a given software application, or (Continued)

operates under a relatively restricted protocol, depending on whether it is inside or outside of the permitted use region.

37 Claims, 4 Drawing Sheets

(56) References Cited

U.S. PATENT DOCUMENTS

| | | | |
|---|---|---|---|
| 2005/0071666 A1* | 3/2005 | Chu et al. | 713/200 |
| 2005/0114265 A1* | 5/2005 | Satkunanathan et al. | 705/59 |
| 2006/0030338 A1* | 2/2006 | Harken et al. | 455/456.6 |
| 2006/0099969 A1* | 5/2006 | Staton et al. | 455/456.4 |
| 2007/0143013 A1* | 6/2007 | Breen | 701/211 |
| 2007/0188375 A1* | 8/2007 | Richards et al. | 342/125 |

OTHER PUBLICATIONS

Davis, W. (2001). Operating systems:A systematic view—5th edition. Addison Wesley Longman. pp. 11-18 and 34.*
User Guide for "The Seeker Mobile Locating Solution" (0510-0216-B-Web), pp. 7-13.
Internet website: www.wyse.co.in/sentry-hardware-lock-faqs.html, "Hardware Locks, Fingerprint Access Control, Digital Storage from WYSE"; printed Aug. 2, 2006, 3 pages.
Internet website: www.pantechnica.com/resources/kb/dongle.html, "PanTechnica Corporation", printed Aug. 2, 2006, 1 page.
Internet website: www.consumer-research-guide.com/rfid.html, "What is RFID", printed Jul. 17, 2006, 2 pages.

\* cited by examiner

AREA-LIMITED SOFTWARE UTILITY

This application claims the benefit of priority based on provisional application No. 60/841,470 entitled "Area-Limited Software Utility," filed Aug. 31, 2006.

BACKGROUND OF THE INVENTION

The present invention relates to devices and methods for restricting access to and use of computer programs, and more particularly to preventing or limiting the use of computer programs based on processor location.

As techniques for storing and transmitting digital information continue to improve, it becomes increasingly convenient to generate and transmit complex computer programs and other large collections of digital data. This has enabled computer program developers and vendors to engage in high volume marketing of computer software through distribution of data storage media such as magnetic and optical discs, and electronically via the internet by allowing customers to download programs to their own computers.

This convenience, however, has increased the risk of unauthorized usage and theft of computer programs and related data. A variety of schemes have been developed to discourage or prevent unauthorized use of computer software. For example, U.S. Pat. No. 5,761,651 (Hasebe et al.) discloses a software charging system capable of controlling access to software based on time and date, credit balance of a user, and a digitally stored key that must be matched by the prospective user. In U.S. Pat. No. 6,044,469 (Horstmann), publishers of electronically distributed software can select software protection measures from among several software-based and hardware-based options.

The selected options are written to a license file attached to the software. When a user attempts to run the software, a protector module reads the license file and executes a code for each software protection option selected.

U.S. Pat. No. 7,035,626 (Luciano, Jr.) is directed to remote gaming and lottery systems accessible using cellular phones. The phones are configured to provide location information, equipped either to use the E-911 location system or GPS data. The caller's location is used to determine his or her jurisdiction, and thus ensure that the gaming activity complies with the gambling laws of that jurisdiction.

While these systems and others like them may be suitable for their intended purposes, there are a variety of applications that are not well served by these systems. For example, licensing and distributorship agreements governing or involving computer programs frequently include territorial restrictions on the use or sale of the computer programs. It would be advantageous to incorporate into the software a "self governing" feature to prevent or limit usage consistent with the territorial restriction. On a smaller scale, where computer programs are developed or tailored to the needs of a specific facility, e.g. a college campus or particular building, there may be contractual and safety reasons for limiting use of the programs to the particular facility. On a smaller scale yet, it may be decided to limit the usage and operability of particular software to a "territory" defined by a particular computer, or to the vicinity of one or more permitted users, in which case the "territory" may be movable.

SUMMARY OF THE INVENTION

The present invention has several aspects, each directed to one or more of the foregoing needs. In general, a computer adapted to use a given computer program is further adapted to incorporate a position identifying feature capable of generating a signal to identify the computer's location. The given computer program incorporates a module or thread that seeks the position indicating signal. In some embodiments, detection of the position indicating signal is sufficient to allow full usage of the software. In other versions, detection of the signal is followed by comparison of the position-indicating signal with a previously stored definition of a territory in which full usage of the software is permitted. Failure to detect the position indicating signal, or failure of the detection signal to match the defined territory, either prevents access to the particular computer program, or confines usage to a portion of the program's functionality or value.

One aspect of the present invention is a process for governing use of an information processing application by an information processing device. The process includes: (a) comparing a current location of an information processing device with a selected region encompassing permitted locations, to determine whether the information processing device resides at a permitted location; (b) in response to determining that the information processing device resides at a permitted location, enabling the information processing device to function according to a first protocol governing access to and use of an information processing application; and (c) alternatively, in response to determining that the information processing device does not reside at a permitted location, causing the information processing device to function according to a second protocol governing use of the information processing application. The second protocol is more restrictive than the first protocol.

The second protocol can be more restrictive than the first in one or more of several aspects. For example, as compared to a first protocol allowing access and unlimited use of a given software program or collection of data, the second protocol may entail limited usage, access but no usage, or denial of access altogether.

The step of comparing the current location with the selected region may comprise designating a plurality of discrete boundary points to establish a boundary surrounding the selected region, and then determining whether the current location is inside the boundary. Alternatively, the comparing step may entail designating a center point, and determining whether the processing device is within a predetermined distance of the center point. In one approach, a signal generator such as a WiFi transmitter or RFID transponder is disposed at the center point. The amplitude of the signal received from the source varies with the distance from the source, thus to indicate whether the processing device is within the territory. In another approach, several external signal sources, e.g. E-911 compliant towers, can be used to define a collection of center points with circular or spherical boundaries that overlap one another to define a selected territory.

Another aspect of the invention is a system for governing use of an information processing application by an information processing device. The system includes a position detector for generating position information describing a current location of an information processing device. A first storage area is adapted to contain the position information. A second storage area is adapted to contain territorial information describing a selected region encompassing permitted locations. A comparator, associated with the first storage area and the second storage area, is adapted to compare the position information with the territorial information and generate comparator signals indicating whether an information processing device resides at a permitted location. A control component is associated with the comparator to receive the comparator signals and, alternatively: (i) to enable the information processing device to function according to a first protocol governing use of an information processing application in response to a comparator signal indicating that the information processing device resides at a permitted location; and (ii) to cause the information processing device to function according to a second protocol governing use of the information processing application in response to a comparator signal indicating that the information processing device does not reside at a permitted location. The second protocol is more restrictive than the first protocol with respect to using the information processing application.

Preferably the position detector, the storage areas, the comparator and the control component reside within the information processing device. In one version of the system, the control component resides within the information processing application as part of a computer program. In turn, the program resides within the processing device. In another version, the control component resides within the processing device, independently of the information processing application. In this case, the information processing application is configured to acquire the control component before it can be used by the processing device.

A further aspect of the invention is an information processing system adapted to operate according to alternative protocols for using information processing applications. The processing system includes an information processing network including an information processing device. A position sensor inside the information processing device is adapted to generate position information indicating a current location of the processing device. A location testing function inside the processing device is adapted to generate alternative testing function signals indicating, respectively, that a current location indicated by the position information (i) resides within a selected territory comprised of permitted locations, and (ii) resides outside of the selected territory. A control function is operatively associated with the testing function to receive the testing function signals, and alternatively: (i) enable the processing device to function according to a first protocol governing use of an information processing application in response to a testing function signal indicating that the current location resides within the selected territory; and (ii) cause the processing device to function according to a second protocol governing use of the information processing application in response to a testing function signal indicating that the current location resides outside of the selected territory.

In one preferred approach, the testing function signals depend on the amplitude of a signal received from a signal generating source outside of the information processing device. Advantageously, a threshold amplitude for indicating that the current location resides within the selected territory is adjustable, to controllably alter the size of the selected territory.

In another preferred approach, the location testing function is adapted to generate a border to define the selected territory. The current location is compared to the territory, and the resulting testing function signals depend on whether the current location is surrounded by the boundary.

Thus in accordance with the present invention, computer programs are adapted to be "self-enforcing" as to territorial restrictions governing their usage, whether the territory involved is the size of a country, state, city block or room, and regardless of whether the territory is movable or fixed. If desired, these restrictions may be implemented in conjunction with restrictions dependent on other factors, e.g. financial (payment) information or time.

IN THE DRAWINGS

For a further understanding of the foregoing features and advantages, reference is made to the following detailed description and to the drawings, in which.

DETAILED DESCRIPTION OF THE PREFERRED EMBODIMENTS

Figure 1:
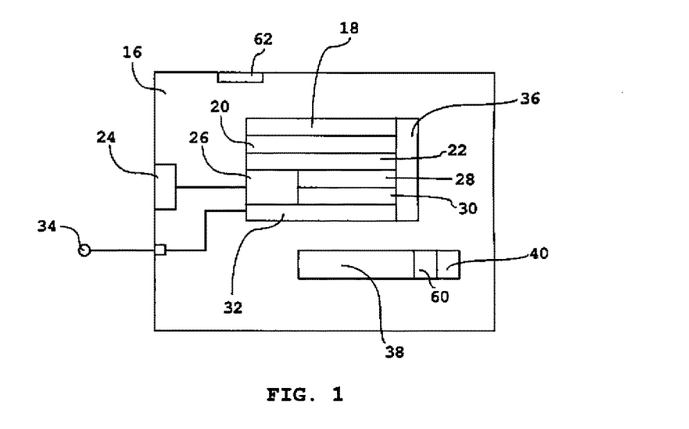
FIG. 1 is a schematic view of an information processor configured in accordance with the present invention.

Turning now to the drawings, FIG. 1 shows a processor 16 which can be, for example, a desktop computer or personal computer (PC). While not necessarily fixed in location, processor 16 is expected to remain within a given facility, e.g. within a building for oversight of environmental (HVAC) control, or within a shopping center or on a college campus to provide a similar oversight function. It is to be recognized that this is an exemplary embodiment, in that the present invention can be practiced in conjunction with a wide variety of computer programs that may or may not relate to environmental control.

Processor 16 incorporates registers for storing data and for storing computer programs operable on the data to perform various functions on the data, or in response to changes in the data. For example, relatively permanent storage areas include a register 18 containing environmental condition information such as acceptable ranges for temperature and humidity. A register 20 contains information defining the territory or area of permitted use. A register 22 contains chronological information, such as the time over a period which use is permitted.

A global positioning system (GPS) receiver 24 is mounted to processor 16. The GPS receiver, based on radio frequency signals from at least four satellites of the GPS "constellation," generates time and position (latitude, longitude, altitude) information, and provides that information to a GPS register 26 having a time sector 28 and a position sector 30.

More volatile memory includes a register 32 for storing current conditions, for example as provided by condition (e.g. temperature and humidity) sensors, one of which is shown at 34. GPS register 26 stores the position and time information.

Software in processor 16 includes a comparator function 36 adapted to compare current readings with information previously stored, more particularly: the current environmental condition information in register 32 relative to the desired condition information in register 18; the current GPS position information in register sector 30 with respect to the territory defined in register 20, and the GPS current time information in register sector 28 with respect to the chronological information in register 22.

A computer program 38, conveniently thought of as an information processing application, is stored in processor 16, or in network versions may be downloaded from another processor. Based on input from condition sensors 34, computer program 38 is operable to adjust conditions within the facility, or within each one of several environmental control zones throughout the facility. More particularly, program 38 periodically causes comparator function 36 to compare the current temperature or other condition in the facility or zone with a desired temperature range or condition. Upon finding a current reading outside of the range, program 38 activates or adjusts the heating, cooling and ventilating system as necessary to bring the current condition back into the permitted range.

Computer program 38 may be subject to a license that restricts its use to the facility. In addition, or alternatively, the program may be adapted to perform certain functions such as tests on the facility cooling and heating system, that are best performed while facility occupancy is likely to be at a minimum. The program may be so particularized to the facility that convenience or safety considerations dictate that the program should be used only in conjunction with that facility. To this end, computer program 38 incorporates a control segment 40 operable to prevent full use of the program outside of the territory defined in register 20. Control segment 40 can be provided as a module activated whenever the user attempts to open computer program 38. Alternatively, segment 40 may operate as a thread, independently of other functions performed by program 38, to periodically determine compliance with the territorial limitation. In either event, segment 40 causes comparator function 36 to compare the contents of registers 20 and 26 (specifically, sector 30) in search of a match. The manner of comparing register contents can vary with the method defining the permitted territory.

Figure 2:
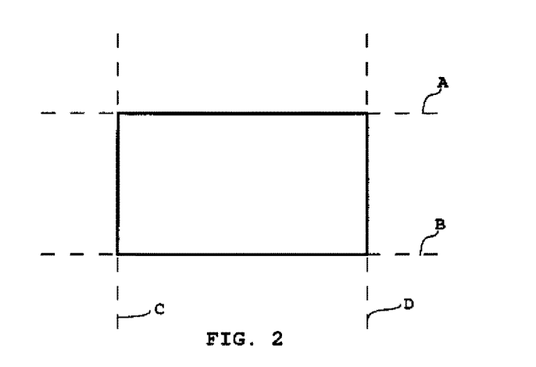
FIG. 2 is a diagram schematically illustrating a boundary defining a permitted use region or territory.

For example, FIG. 2 illustrates a relatively simple approach to using latitude and longitude to define a rectangular area in the Northern Hemisphere, west of the Greenwich Meridian and east of the International Date Line. Horizontal lines A and B represent an upper latitude and a lower latitude, respectively. Vertical lines C and D respectively represent maximum and minimum longitudes. Assuming the GPS position information includes a latitude X and longitude Y, then a match is found by satisfying the following two equations:

$$A \geq X \geq B; \quad (1)$$

and $$C \geq Y \geq D. \quad (2)$$

In a more complex approach, the territory can be defined by a series of latitude/longitude points arranged to form a boundary around the permitted territory, which could be a state or a metropolitan area. According to yet another alternative, latitude/longitude points are arranged in rows and columns to define overlapping circular area segments cooperating to "fill" a permitted territory with a geometric or irregular boundary.

Figure 3:
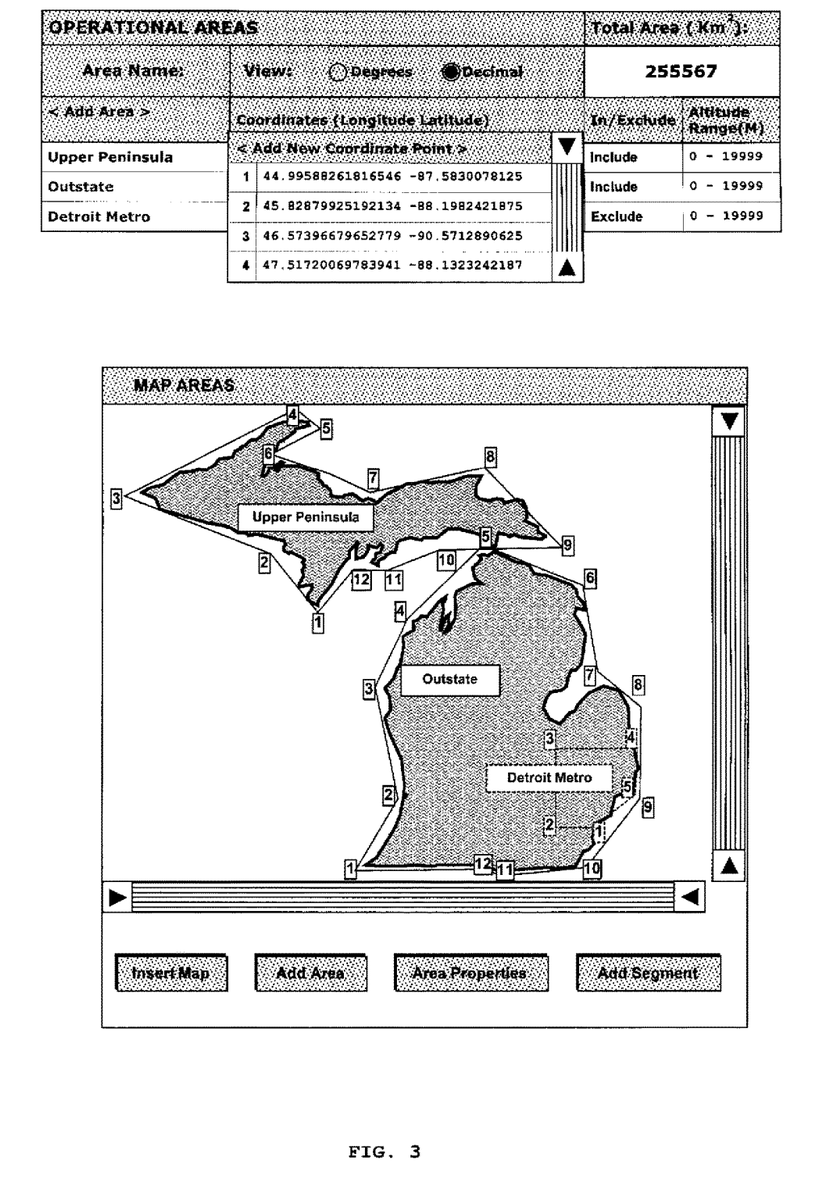
FIG. 3 is a diagram illustrating an alternative approach to defining a permitted use region.

FIG. 3 illustrates the use of latitude/longitude points to form a boundary about the state of Michigan, including the Upper Michigan Peninsula. An additional five data points are used to define the Detroit metropolitan area as distinguished from the rest of the state. The "include" and "exclude" inditia above the map indicate that the particular customer is licensed for use throughout the state of Michigan except for the Detroit metropolitan area. The altitude ranges of 0-19,999 meters effectively remove height as a limiting factor.

Also as shown above the map are the first four of the twelve latitude/longitude coordinates used to determine the upper-peninsula portion of the licensed territory. As indicated, the licensor can add further coordinates to define the boundary with more precision, if desired. Areas and area segments can be added or deleted. In this example where the territory defining software is used to implement licensing restrictions, that software is maintained and controlled exclusively by the licensor.

Figure 4:
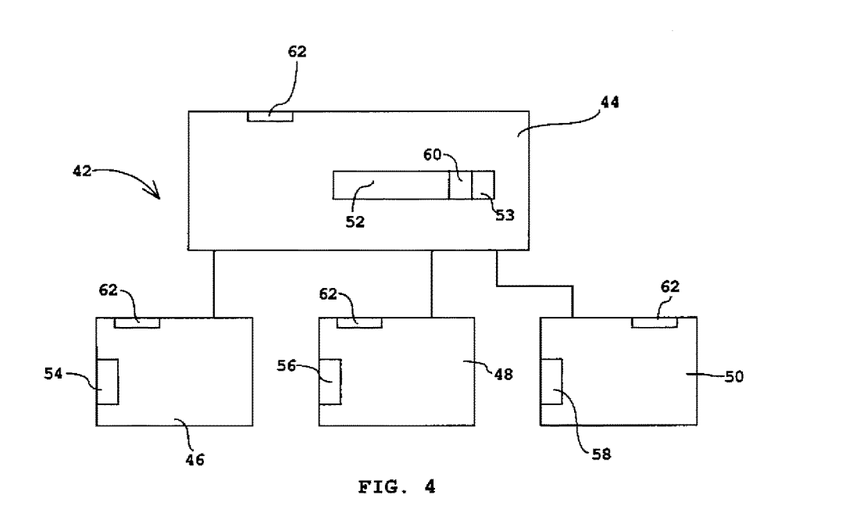
FIG. 4 is a schematic view of an information processing network configured according to the invention.

In an alternative system 42 shown in FIG. 4, a central station or hub 44 is part of a network shared by processors 46, 48 and 50. A computer program 52 having a control segment 53 resides in hub 44, and can be downloaded to any one of the network processors. The processors have their own GPS receivers, as indicated at 54, 56 and 58, respectively. The processors further have their own respective registers and comparator functions. As before, execution of computer program 52 depends on a comparison of the GPS position information with the defined territory to produce a match. The system can be configured to produce several alternative responses to the absence of a match, including preventing the processor from downloading program 52; permitting downloading but preventing use of the program; and permitting downloading but restricting the functionality of the software.

The altitude segment of the GPS position information can be ignored. Or, if desired, the altitude segment can be taken into account, e.g. to deny access to the computer program or preclude an otherwise available operation above a selected height. The parameters of the standard positioning service (SPS) of the global positioning system, in particular vertical accuracy in the hundred-meter range, can be used to differentiate between ground level and aircraft in flight, although there are practical limitations to distinguishing by height using this approach. Techniques such as measuring barometric pressure, and triangulation with radio transmitters, can be employed to enhance the accuracy of vertical data.

Another limitation is that certain locations, e.g. the lower floors of office towers and other high buildings, are not conducive to high quality reception of GPS signals. In such cases, computer program 52 (or program 38) can incorporate a timing function 60 that acts as an override feature to permit the usage for a predetermined time after the sensing of a GPS signal and a successful match based on the GPS position information. Further in such cases, each of processors 46-50 (or processor 16) is equipped with a motion sensor 62 to prevent the override feature from operating in the event that the processor is moved to a location outside of the permitted territory. The motion sensor preferably is configured with a motion sensing threshold to allow the limited motion commensurate with moving the processor to another office, or to another floor of the facility.

Figure 5:
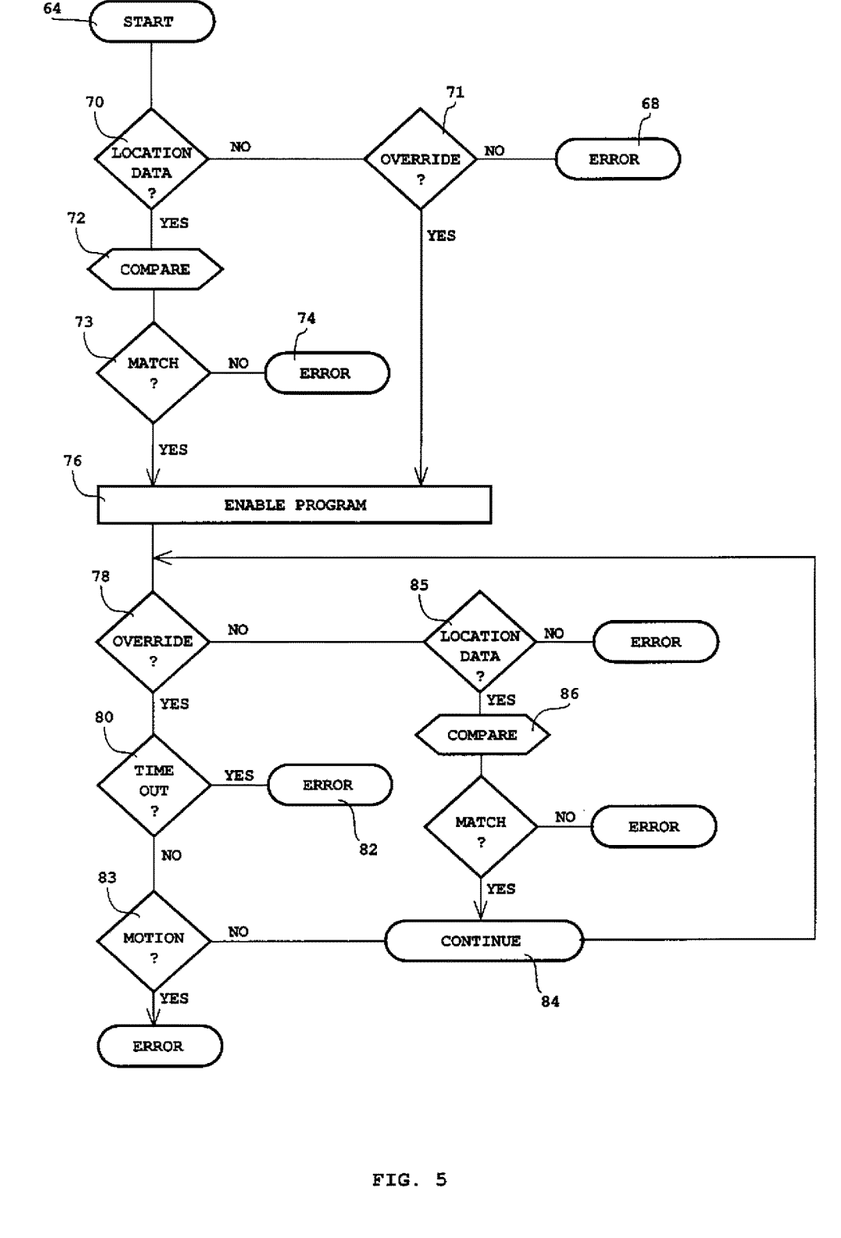
FIG. 5 is a flow chart illustrating the operation of software and hardware components according to the invention.

FIG. 5 is a flowchart illustrating the operation of processor 16 and associated hardware components in conjunction with control segment 40. The process starts at 64 with a request for access to computer program 38, which generates a search for current position information, in this case GPS receiver data in register 26, as indicated at 70. In a processor not equipped with a GPS receiver, or where a GPS receiver is not generating GPS data, the lack of GPS data causes the program to generate an inquiry at 71 as to whether a previous GPS detection and a match have triggered the override feature. If not, an error message is generated at 68 and access is denied.

If GPS position information is detected, the information is compared at 72 with the defined territory. If a match query at 73 fails to yield a match, an error message is generated at 74 and access is denied.

Returning to 73, if the result is a match, the processor is determined to be within the permitted territory, and computer program 38 is enabled as indicated at 76. Returning to 71, if an override is indicated, the computer program likewise is enabled.

In any given application, it may be necessary or desirable to monitor the use of computer program 38 to ensure that the territorial restriction is maintained. To this end, control segment 40 can be configured to periodically monitor processor 16 as to compliance with the territorial restriction. The control segment at 78 first checks to determine whether the override feature is effective. If so, the inquiry at 80 is whether the override time limit has been reached. If so, an error message is generated at 82 and computer program 38 can no longer be executed on processor 16.

If time remains, motion sensor 62 is queried at 83 to determine whether the motion threshold has been reached. If so, an error message is generated and use of the computer program is disabled. If not, operation of the program continues, as indicated at 84.

Returning to 78, if the override feature is inactive, GPS register 26 is queried at 85 for the presence of GPS position information. If no such information is present, an error message is generated and use of computer program 38 is disabled. If GPS information is present, then a comparison function 86 is performed to determine whether the position information in GPS register 26 matches the defined territory in register 20. If so, use of the computer program continues. If not, an error message is generated, and use is disabled.

Figure 6:
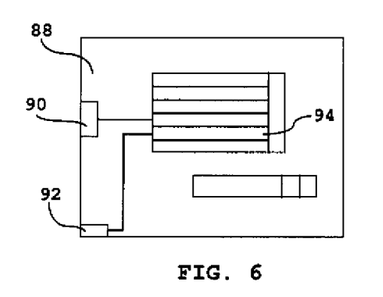
FIG. 6 schematically illustrates an alternative embodiment processor configured to use E-911 data.

While processor 16 uses GPS receiver 24 to generate current position information, other options may be used. FIG. 6 shows a processor 88 configured for limiting software access for use based a territorial restriction, without using GPS data to generate position information. The processor incorporates an E-911 compliant transceiver 90. Transceiver 90 is configured to interact with several (typically three or more) towers or sites of a cellular network, to determine the position of processor 88 based on differences in transmission among the cellular sites, e.g. differences in transmission times between transceiver 90 and the various sites and differences in the angle or direction of arrival of signals from transceiver 90 to each of the sites.

The E-911 data, unlike the GPS data, does not incorporate chronological information. Accordingly, processor 88 incorporates an internal clock 92 to generate current time information for a current time register 94. In other respects, processor 88 can be substantially identical to processor 16.

A primary advantage of using transceiver 90 and internal clock 92 in lieu of GPS receiver 24 is the capability to generate reliable position information in locations where GPS reception is inadequate.

According to another embodiment of the invention (FIG. 7), a processor 96 incorporates a transponder 98 in the form of an RFID (radio frequency identification) tag. Tag 98 preferably is an active tag, powered by the processor power supply. A computer program 100 residing in the processor includes a control segment 102 used as before to grant or deny access to computer program 100 depending on whether processor 96 is located within a permitted territory.

Figure 7:
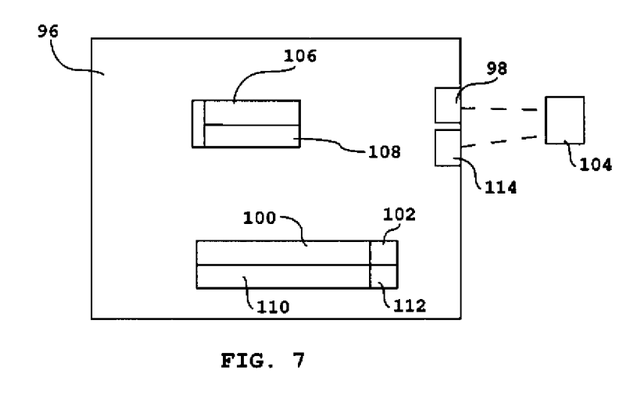
FIGS. 7 and 8 schematically illustrate further alternative processors that utilize RFID information to determine regions of permitted use.

When interrogated by a remote transceiver 104, preferably an RFID reader, tag 98 generates information including a software I.D. code unique to computer program 100, and provides the I.D. code to a software I.D. register 106. Control segment 102 includes the I.D. code, and is configured to provide the I.D. code to register 108 for comparison with the contents of register 106 in search of a match. As an alternative, the control segments of several different computer programs can include the same software I.D. code, in which case a match provides access to all of these programs.

Further, because transponders like tag 98 can be configured to generate I.D. codes unique to different computer programs, processor 96 can incorporate several different tags for controlling access to different computer programs or groups of programs. For example, a second computer program 110 has a control segment 112 incorporating a second software I.D. code different than the I.D. code corresponding to computer program 100. A second RFID tag 114, also responsive to reader 104, provides the second software I.D. code to register 106.

In this version of the system, the permitted area is determined by the distance between processor 96 and RFID reader 104, and by the strength of the signals transmitted between the reader and the RFID tag or tags. In effect, the permitted use territory has a spherical (or typically in a more practical sense, circular) boundary about reader 104. When the distance between the processor and reader is increased sufficiently to prevent the tags from sensing the signal from the reader, access to the controlled computer programs is denied. When active RFID tags are employed, the maximum separation permitted is about 300 feet, forming a circular area about the reader with a 300 foot radius.

Further, because the signal strength diminishes as the processor/reader separation distance increases, the permitted area can be reduced by setting a signal strength threshold. For example, control segment 102 may be configured to perform the I.D. code comparison step only upon receipt of a signal from reader 104 indicating that the signal received from the associated tag was stronger then a predetermined threshold. Then, even though the reader and tag may be capable of exchanging signals over distances of up to 300 feet, the threshold may effectively reduce the permitted distance to 150 feet or another value as desired.

Thus, while limited in size as compared to permitted use territories defined using GPS and E-911 positioning techniques, the RFID techniques can define permitted territories with greater accuracy, and are particularly well suited for restricting permitted use to buildings or other facilities ranging in size up to a city block.

Figure 8:
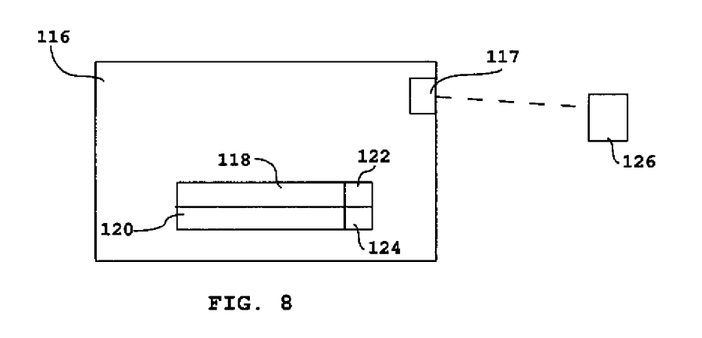

In an alternative RFID system shown in FIG. 8, a processor 116 incorporates an RFID reader 117 powered by the processor's power supply. Computer programs 118, 120 with respective control segments 122, 124 reside in the processor. A remote transponder 126 is provided in the form of a RFID tag. Tag 126, preferably a passive tag with no power source, functions as a non-contact "smart card." When held sufficiently close to processor 114, tag 126 picks up the interrogation signal from reader 116 and returns a signal to the reader which includes a software I.D. code uniquely associated with a computer program 118 or program 120. Alternatively, the returned signal can include several different software I.D. codes. As before, a match of each I.D. code generated and transmitted to the processor by tag 126, with the I.D. code in one of the control segments, enables access to the associated computer program.

Because tag 126 is passive, the permitted territory is considerably reduced, to a size defined by a processor/tag separation of at most about several meters. The area can be reduced further by setting a predetermined strength threshold with respect to the signal returned to reader 116 by the tag. Several different tags or smart cards can be employed, either to permit several individuals to gain access to protected software, or to uniquely protect different computer programs through different I.D. codes. In either event, each smart card determines a permitted use territory that is movable along with the individual holding the card. A mobile permitted use territory can be particularly convenient in cases where the processor itself is mobile, such as for laptop computers or onboard computers in automobiles or other vehicles. In such cases, the system can be configured to require a match of software I.D. codes to enable log-on and prevent operation of the computer in the absence of a match, thus to function as a theft deterrent.

In yet another alternative not illustrated, a single WiFi transmitter or "hot spot," or a plurality of such transmitters are used in combination with a wireless adaptor in a processor to define a permitted use area for the processor in terms of access to and use of certain programs configured either to incorporate control segments or gain access to control segments as previously described.

Thus in accordance with the present invention, computer program modules cooperate with computer hardware to selectively enable access to and full usage of the software only within permitted use areas. Restricted computer programs incorporate control modules that interact with hardware disposed on or within the processor, to effectively maintain the area restriction, even though the computer program may be transported on discs or other media, or transmitted via the internet from one processor to another.

What is claimed is:

1. A process for governing use of an information processing application, including:
    defining a selected region encompassing permitted locations of a processing device;
    in conjunction with a request for access to a particular information processing application, periodically comparing a current location of the information processing device with the selected region encompassing permitted locations, to determine whether the information processing device resides at a permitted location;
    in response to determining that the information processing device resides at a permitted location, using a control component operatively associated with the particular information processing application to enable the information processing device to function according to a first protocol governing access to and use of the particular information processing application; and
    alternatively, in response to determining that the information processing device does not reside at a permitted location, using the control component to cause the information processing device to function according to a second protocol governing use of the particular information processing application, wherein the second protocol is more restrictive than the first protocol;
    initiating an override function effective for a predetermined time interval responsive to a given determination that the information processing device resides at a permitted location and enabling the information processing device to function according to the first protocol for the duration of the predetermined time interval, regardless of whether a subsequent comparison during the predetermined time interval fails to indicate that the information processing device resides at a permitted location; and wherein said defining a selected region is performed independently of the particular information processing application.

2. The process of claim 1 wherein:
defining the selected region comprises establishing a boundary surrounding the selected region.

3. The process of claim 2 wherein:
establishing the boundary comprises designating a plurality of discrete boundary points.

4. The process of claim 3 wherein:
establishing the boundary comprises using the discrete boundary points to define a surface area, whereby the selected region has no altitude restriction.

5. The process of claim 1 wherein:
comparing the current location with the selected region comprises designating a center point, and determining whether the information processing device is within a predetermined distance of the center point.

6. The process of claim 5 wherein:
said comparing comprises designating a plurality of center points and determining whether the information processing device is within the predetermined distance of at least one of the center points.

7. The process of claim 5 further including:
selectively changing a position of the center point.

8. The process of claim 1 further including:
using a substantially fixed positioning system to define the selection region, wherein the positioning system is selected from the group consisting of: a GPS satellite system; an E-911 compliant site system; a RFID transponder system; and a WiFi transmitter system.

9. The process of claim 1 wherein:
causing the information processing device to function according to the second protocol comprises denying use of the particular information processing application.

10. The process of claim 1 wherein:
causing the information processor to function according to the second protocol comprises allowing access to the particular information processing application while imposing restrictions on use of the application.

11. The process of claim 1 wherein:
said using a control component operatively associated with the particular information processing application comprises providing the control component as a segment of the information processing application.

12. The process of claim 1 wherein:
said using a control component operatively associated with the particular information processing application comprises storing the control component in the information processing device and configuring the particular information processing application to acquire the control component in conjunction with the request for access to the particular information processing application.

13. The process of claim 1 further including:
sensing an environmental condition, and comparing the sensed environmental condition with previously stored environmental condition information.

14. The process of claim 1 further including:
disabling the override function responsive to sensing motion of the information processing device that exceeds a predetermined motion threshold.

15. A system for governing use of an information processing application, including:

a position detector for generating position information describing a current location of an information processing device;

a first storage area adapted to contain the position information;

a second storage area adapted to contain territorial information describing a selected region encompassing permitted locations;

a comparator associated with the first storage area and the second storage area, adapted to periodically compare the position information with the territorial information and generate comparator signals indicating whether an information processing device resides at a permitted location; and a control component operatively associated with a particular information processing application and with the comparator to receive the comparator signals and, in conjunction with a request for access to the particular information processing application, to alternatively:
  (i) enable the information processing device to function according to a first protocol governing use of the particular information processing application in response to a comparator signal indicating that the information processing device resides at a permitted location; and
  (ii) cause the information processing device to function according to a second protocol governing use of the information processing application in response to a comparator signal indicating that the information processing device does not reside at a permitted location;

wherein the territorial information resides in the second storage area separate from and independent of the particular information processing application;

an override function effective during a time interval initiated responsive to a given comparator signal indicating that the information processing device resides at a permitted location, wherein the control component is adapted to maintain the first protocol for the duration of the time interval regardless of whether comparator signals following the given comparator signal fail to indicate that the information processing device resides at a permitted location; and wherein the second protocol is more restrictive than the first protocol with respect to using the information processing application.

16. The system of claim 15 wherein:
the position detector resides within the information processing device.

17. The system of claim 15 wherein:
the position detector is adapted to use signals received from a plurality of external sources selected from the group of sources consisting of: GPS satellites, E-911 sites, WiFi transmitters, and RFID transponders.

18. The system of claim 15 wherein:
the first storage area comprises a register in the information processing device.

19. The system of claim 15 wherein:
the second storage area comprises a register in the information processing device.

20. The system of claim 19 wherein:
the register is adapted to store a plurality of boundary points cooperating to define a boundary surrounding the selected region.

21. The system of claim 19 wherein:
the register is adapted to store a plurality of center points.

22. The system of claim 15 wherein:
the comparator resides within the information processing device.

23. The system of claim 22 wherein:
the comparator is adapted to determine whether the current location is surrounded by a boundary defining the selected region.

24. The system of claim 22 wherein:
the comparator is adapted to determine whether the current location is within a predetermined distance from a center point.

25. The system of claim 15 wherein:
the control component resides within the particular information processing application.

26. The system of claim 15 wherein:
the control component resides within the information processing device and the particular information processing application is configured to acquire the control component in conjunction with said request for access.

27. The system of claim 15 further including:
an environmental condition sensor;
a third storage area adapted to contain environmental condition information; and
a comparator function associated with the environmental condition sensor and the third storage area for comparing an environmental condition sensed by the environmental condition sensor with the environmental condition information.

28. The system of claim 15 further including:
a motion sensor for disabling the override function responsive to sensing motion of the information processing device that exceeds a predetermined motion threshold.

29. An information processing system adapted to operate according to alternative protocols for using information processing applications, including:
an information processing network including an information processing device;
a position sensor inside the information processing device adapted to generate position information indicating a current location of the information processing device;
a location testing function inside the information processing device, adapted to define a selected territory, and to periodically generate alternative testing function signals indicating, respectively, that the current location indicated by the position information (i) resides within a selected territory comprised of permitted locations, and (ii) resides outside of the selected territory; and
a control function operatively associated with a particular information processing application and with the testing function, the control function being configured to receive the testing function signals in conjunction with a request for access to the particular information processing application, and alternatively:
  (i) enable the information processing device to function according to a first protocol governing use of the particular information processing application in response to a testing function signal indicating that the current location resides within the selected territory; and
  (ii) cause the information processing device to function according to a second protocol governing use of the particular information processing application in response to a testing function signal indicating that the current location resides outside of the selected territory;

an override function effective during a time interval initiated responsive to a given testing function signal indicating that the information processing device resides at a permitted location, wherein the control function is adapted to maintain the first protocol for the duration of the time interval regardless of whether any testing function signals following the given testing function signal indicate that the information processing device resides at a permitted location; and wherein the location testing function is operable to define the selected territory independently of the particular information processing application.

30. The system of claim 29 wherein:

the testing function is adapted to generate the testing function signals dependent upon an amplitude of a signal received from a source outside of the processing device.

31. The system of claim 30 wherein:

a size of the selected territory is alterable through adjustment of a threshold amplitude at which the testing function generates a testing function signal indicating that the current location resides within the selected territory.

32. The system of claim 29 wherein:

the testing function is adapted to generate a boundary defining the selected territory, and to generate the testing function signals dependent upon whether the current location is surrounded by the boundary.

33. The system of claim 29 wherein:

the information processing network includes a plurality of interconnected information processing devices, in which a selected one of the information processing devices functions as a hub, and the control function resides exclusively in the selected processing device.

34. The system of claim 29 wherein:

the control component resides within the particular information processing application.

35. The system of claim 29 wherein:

the control component resides within the information processing device, and the particular information processing application is configured to acquire the control component in conjunction with said request for access.

36. The system of claim 29 further including:

an environmental condition sensor; and a comparator function for comparing an environmental condition sensed by the environmental condition sensor with predetermined environmental condition information.

37. The system of claim 29 further including:

a motion sensor for disabling the override function responsive to sensing motion of the information processing device that exceeds a predetermined motion threshold.

* * * * *